United States Patent
Pattan et al.

(10) Patent No.: US 12,012,887 B2
(45) Date of Patent: Jun. 18, 2024

(54) SYSTEMS AND METHODS FOR PROVIDING UNIFORM EXHAUST GAS FLOW TO AN AFTERTREATMENT COMPONENT

(71) Applicant: CUMMINS EMISSION SOLUTIONS INC., Columbus, IN (US)

(72) Inventors: Reshma Pattan, Chebrolu (IN); Ryan M. Johnson, Cottage Grove, WI (US); Mahendra Mittapalli, Pune (IN); Priyanka S. Kujur, Gumla (IN)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 5 days.

(21) Appl. No.: 17/626,956

(22) PCT Filed: Jul. 15, 2019

(86) PCT No.: PCT/US2019/041818
§ 371 (c)(1),
(2) Date: Jan. 13, 2022

(87) PCT Pub. No.: WO2021/010964
PCT Pub. Date: Jan. 21, 2021

(65) Prior Publication Data
US 2022/0356831 A1 Nov. 10, 2022

(51) Int. Cl.
*F01N 3/28* (2006.01)

(52) U.S. Cl.
CPC ......... *F01N 3/2892* (2013.01); *F01N 3/2882* (2013.01); *F01N 2240/20* (2013.01)

(58) Field of Classification Search
CPC ............... F01N 2240/20; F01N 3/2892; F01N 2470/18; F01N 13/0097; B01F 25/4315
See application file for complete search history.

(56) References Cited

U.S. PATENT DOCUMENTS

| 5,043,146 A | 8/1991 | Ishikawa et al. |
| 6,722,123 B2 | 4/2004 | Liu et al. |

(Continued)

FOREIGN PATENT DOCUMENTS

| DE | 10 2011 089 969 B4 | 5/2015 |
| JP | 2003-074335 A | 3/2003 |

(Continued)

OTHER PUBLICATIONS

First Office Action issued for Indian Patent Application No. 202248051408 dated Nov. 3, 2022.

(Continued)

*Primary Examiner* — Anthony Ayala Delgado
(74) *Attorney, Agent, or Firm* — Foley & Lardner LLP

(57) ABSTRACT

An inlet assembly for a housing containing an aftertreatment component of an aftertreatment system comprises an inlet conduit configured to be disposed substantially perpendicular to a longitudinal axis of the housing. A flow redirection conduit is disposed downstream of the inlet conduit and is coupled to the end of the housing. A plurality of protrusions project from a sidewall of the flow redirection conduit towards an inlet face of the aftertreatment component and are configured to provide a uniform exhaust gas flow to the inlet face. Alternatively, a flow distribution plate having a plurality of slots defined substantially perpendicular to the longitudinal axis is disposed in the flow redirection conduit, the plate being inclined with respect to the longitudinal axis. The slots are configured to provide a uniform exhaust gas flow to the inlet face.

25 Claims, 12 Drawing Sheets

(56) References Cited

U.S. PATENT DOCUMENTS

| | | | |
|---|---|---|---|
| 8,470,253 B2 | 6/2013 | Blaisdell et al. | |
| 8,745,979 B2 | 6/2014 | Sedlacek et al. | |
| 8,814,969 B2 * | 8/2014 | Nagasaka | B01D 46/0043 |
| | | | 422/177 |
| 9,334,785 B2 | 5/2016 | Marquardt-Stammberger et al. | |
| 9,605,577 B2 | 3/2017 | Navathe et al. | |
| 10,830,117 B2 * | 11/2020 | Zoran | F01N 3/103 |
| 2009/0255242 A1 | 10/2009 | Peterson | |
| 2011/0052454 A1 | 3/2011 | Kato | |
| 2011/0167810 A1 * | 7/2011 | Lebas | B01F 25/4521 |
| | | | 60/324 |
| 2013/0086894 A1 * | 4/2013 | Wikaryasz | F01N 13/1822 |
| | | | 60/282 |
| 2013/0097978 A1 * | 4/2013 | Nagasaka | F01N 13/1872 |
| | | | 55/332 |
| 2014/0007562 A1 | 1/2014 | Justin | |
| 2014/0065027 A1 * | 3/2014 | Wikaryasz | F01N 13/0097 |
| | | | 422/176 |
| 2016/0053657 A1 * | 2/2016 | Quadri | F01N 3/28 |
| | | | 60/311 |
| 2016/0215673 A1 | 7/2016 | Noren et al. | |
| 2016/0376969 A1 | 12/2016 | Zhang et al. | |
| 2017/0370262 A1 * | 12/2017 | Zoran | F01N 13/009 |
| 2018/0001279 A1 * | 1/2018 | De Rudder | B01F 25/103 |
| 2018/0135496 A1 | 5/2018 | Yi et al. | |
| 2018/0156092 A1 * | 6/2018 | Inclán | F01N 3/2892 |

FOREIGN PATENT DOCUMENTS

| | | |
|---|---|---|
| JP | 2009-150338 A | 7/2009 |
| KR | 10 2011 0067248 A | 6/2011 |
| WO | WO-2019/078886 A1 | 4/2019 |

OTHER PUBLICATIONS

International Search Report and Written Opinion issued for PCT Application No. PCT/US2019/041818 dated Nov. 13, 2019, 11 pages.

Combined Search and Examination Report issued in U.K. Patent Application No. 2217467.6, dated Dec. 13, 2022.

Office Action in Chinese Patent Application No. 201980097953.5 dated Mar. 23, 2023.

* cited by examiner

SYSTEMS AND METHODS FOR PROVIDING UNIFORM EXHAUST GAS FLOW TO AN AFTERTREATMENT COMPONENT

CROSS-REFERENCE TO RELATED PATENT APPLICATION

The present application is a National Phase Application based on PCT Application No. PCT/US2019/041818, filed Jul. 15, 2019. The contents of this application is incorporated herein by reference in its entirety and for all purposes.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Exhaust gas aftertreatment systems include any of several different components to reduce the levels of harmful exhaust emissions present in the exhaust gas. For example, certain exhaust gas aftertreatment systems for diesel-powered IC engines include a selective catalytic reduction (SCR) system including a catalyst formulated to convert NOx (NO and $NO_2$ in some fraction) into harmless nitrogen gas ($N_2$) and water vapor ($H_2O$) in the presence of ammonia ($NH_3$). Generally, in such aftertreatment systems, an exhaust reductant, (e.g., a diesel exhaust fluid such as urea) is inserted into the SCR system to provide a source of ammonia, and mixed with the exhaust gas to partially reduce the NOx gases. The reduction byproducts of the exhaust gas are then fluidly communicated to the catalyst included in the SCR system to decompose substantially all of the NOx gases into relatively harmless byproducts which are expelled out of the aftertreatment system.

Some aftertreatment systems include an inlet conduit that is located on a side of a housing containing an aftertreatment component of the aftertreatment system. In some case, such inlet conduits include an exhaust gas inlet which is oriented perpendicular to a longitudinal axis of the housing, and redirect exhaust gas from the exhaust gas inlet towards the aftertreatment component. The high pressure of the exhaust gas and redirection of the exhaust gas can cause the exhaust gas to be non-uniformly distributed over an inlet surface or face of the aftertreatment component, resulting in inefficient utilization of the aftertreatment component. Furthermore, a large reduction in exhaust gas pressure can also occur which exerts a back pressure on the exhaust gas. This increases backpressure on engine exhaust gas causing engine to burn more fuel to overcome the increased back pressure, thereby reducing fuel economy.

SUMMARY

Embodiments described herein relate generally to systems and methods for providing a uniform flow to an inlet face of an aftertreatment component disposed in a housing that includes a side mounted inlet assembly. Particularly, embodiments described herein relate to inlet assemblies that have an inlet conduit that is located substantially perpendicular to a longitudinal axis of the housing and a flow redirection conduit coupled to the inlet conduit downstream thereof, and to the housing. The flow redirection conduit includes protrusions formed on a sidewall thereof, or a flow distribution plate disposed therein, each of which are configured to uniformly distribute the exhaust gas over an inlet face of the aftertreatment component.

In some embodiments, an inlet assembly for an aftertreatment system that comprises a housing containing an aftertreatment component, comprises: an inlet conduit configured to be disposed substantially perpendicular to a longitudinal axis of the housing; a flow redirection conduit disposed downstream of the inlet conduit and coupled thereto, the flow redirection conduit configured to be coupled to the housing and redirect exhaust gas received from the inlet conduit towards an inlet face of the aftertreatment component, wherein the flow redirection conduit comprises a sidewall configured to be located opposite to the inlet face of the aftertreatment component, and wherein the sidewall comprises a plurality of protrusions projecting in a direction substantially parallel to the longitudinal axis of the housing, the plurality of protrusions being configured to distribute exhaust gas flow towards the inlet face of the aftertreatment component as the exhaust gas flows between the plurality of protrusions and is redirected towards the inlet face.

In some embodiments, a method comprises providing a housing for an aftertreatment system; disposing an aftertreatment component within the housing along a longitudinal axis of the housing; providing an inlet assembly, comprising: an inlet conduit, and a flow redirection conduit disposed downstream of the inlet conduit and coupled thereto, the flow redirection conduit comprising a sidewall configured to be located opposite to the inlet face of the aftertreatment component, and a plurality of protrusions projecting from the sidewall; and coupling the flow redirection conduit to the housing such that the inlet conduit is oriented substantially perpendicular to the longitudinal axis of the housing, and the plurality of protrusions project in a direction substantially parallel to the longitudinal axis of the housing towards an inlet face of the aftertreatment component, wherein the flow redirection conduit is configured to redirect exhaust gas received from the inlet conduit towards an inlet face of the aftertreatment component, and wherein the plurality of protrusions are configured to distribute exhaust gas flow towards the inlet face of the aftertreatment component as the exhaust gas flows between the plurality of protrusions and is redirected towards the inlet face.

In some embodiments, an inlet assembly for an aftertreatment system that comprises a housing containing an aftertreatment component, comprises: an inlet conduit configured to be disposed substantially perpendicular to a longitudinal axis of the housing; a flow redirection conduit disposed downstream of the inlet conduit and coupled thereto, the flow redirection conduit configured to be coupled to the housing and redirect exhaust gas received from the inlet conduit towards an inlet face of the aftertreatment component; and a flow distribution plate disposed in the flow redirection conduit, wherein the flow distribution plate is inclined at an angle with respect to the longitudinal axis, and wherein the flow distribution plate comprises a plurality of slots configured to distribute exhaust gas flow towards the inlet face of the aftertreatment component as the exhaust gas flows through the plurality of slots towards the inlet face.

In some embodiments, a method, comprises: providing a housing for an aftertreatment system; disposing an aftertreatment component within the housing along a longitudinal axis of the housing; providing an inlet assembly, comprising: an inlet conduit, and a flow redirection conduit disposed downstream of the inlet conduit and coupled thereto; disposing a flow distribution plate within the flow redirection conduit, the flow distribution plate defining a plurality of slots; and coupling the flow redirection conduit to the housing, wherein the flow redirection conduit is configured to redirect exhaust gas received from the inlet conduit towards an inlet face of the aftertreatment component, and wherein the flow distribution plate is inclined at an angle with respect to a longitudinal axis of the housing, and wherein the plurality of slots are configured to distribute exhaust gas flow towards the inlet face of the aftertreatment component as the exhaust gas flows through the plurality of slots towards the inlet face.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
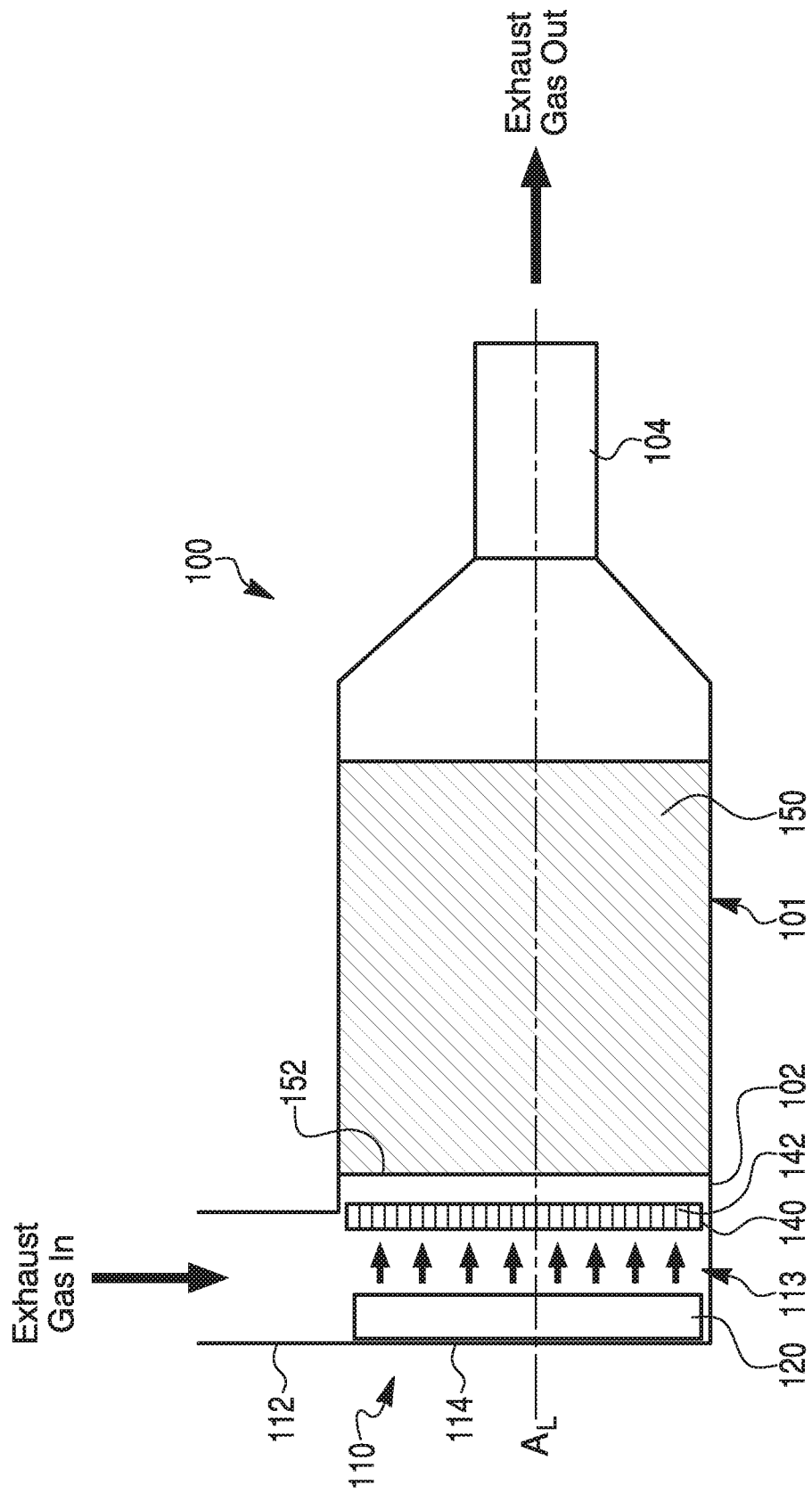
FIG. 1 is a schematic block diagram of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for providing a uniform flow to an inlet face of an aftertreatment component disposed in a housing that includes a side mounted inlet assembly. Particularly, embodiments described herein relate to inlet assemblies that have an inlet conduit that is located substantially perpendicular to a longitudinal axis of the housing and a flow redirection conduit coupled to the inlet conduit downstream thereof, and to the housing. The flow redirection conduit includes protrusions formed on a sidewall thereof, or a flow distribution plate disposed therein, each of which are configured to uniformly distribute the exhaust gas over an inlet face of the aftertreatment component.

Some aftertreatment systems include an inlet conduit that is located on a side of a housing containing an aftertreatment component of the aftertreatment system. In some case, such inlet conduits include an exhaust gas inlet which is oriented perpendicular to a longitudinal axis of the housing, and redirect exhaust gas from the exhaust gas inlet towards the aftertreatment component. The high pressure of the exhaust and redirection of the exhaust gas can cause the exhaust gas to be non-uniformly distributed over an inlet surface or face of the aftertreatment component, resulting in inefficient utilization of the aftertreatment component.

Various embodiments of inlet assemblies including protrusions or a flow distribution plate, and aftertreatment systems including such inlet assemblies described herein may provide one or more benefits including, for example: (1) providing uniform flow of an exhaust gas to an inlet face of an aftertreatment component after redirecting the flow towards an inlet face of the aftertreatment component from an inlet conduit that is located substantially perpendicular to a longitudinal axis of a housing of the aftertreatment component; (2) providing a pressure drop in the exhaust gas flow between which is 9% to 18% lower than conventional designs, thereby having a lower impact on fuel economy; (3) providing a flow distribution index of the exhaust gas across the inlet face of the aftertreatment component in a range of 0.94-0.96 which is significantly better than conventional inlet conduits; and (4) reducing manufacturing complexity and increasing aftertreatment component efficiency by providing better utilization of a surface area thereof.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine, a gasoline engine, a natural gas engine, a biodiesel engine, a dual fuel engine, an alcohol engine, an E85, or any other suitable internal combustion engine) and the reduce constituents of the exhaust gas such as, for example, NOx gases, CO, etc. The aftertreatment system 100 includes a housing 101, an aftertreatment component 150, and an inlet assembly 110 coupled to the housing 101.

The housing 101 defines an internal volume within which the aftertreatment component 150 is disposed. The aftertreatment component 150 is disposed along a longitudinal axis $A_L$ of the housing 101. The housing 101 may have any suitable cross-section, for example, circular, square, rectangular, oval, elliptical, polygonal, or any suitable cross-section.

The aftertreatment component 150 is configured to receive and treat exhaust gas flowing therethrough. The aftertreatment component 150 includes an inlet face or surface 152 through which exhaust gas enters into the aftertreatment component to be treated thereby. In some embodiments, the aftertreatment component 150 comprises a SCR catalyst or any other aftertreatment component configured to decompose constituents of the exhaust gas (e.g., NOx gases such as nitrous oxide, nitric oxide, nitrogen dioxide, etc.), flowing through the housing 101 in the presence of a reductant inserted into the housing 101. The exhaust gas can flow over and about the catalyst such that NOx gases included in the exhaust gas are further reduced to yield an exhaust gas which is substantially free of carbon monoxide and NOx gases. In other embodiments, the aftertreatment component 150 may include an oxidation catalyst (e.g., a diesel oxidation catalyst) configured to decompose CO or unburnt hydrocarbons present in the exhaust gas.

In various embodiments, the aftertreatment system 100 may also include other aftertreatment components such as, for example, an oxidation catalyst (e.g., a diesel oxidation catalyst), one or more particulate matter filters, ammonia oxidation catalysts, mixers, baffle plates, or any other suitable aftertreatment component. Such aftertreatment components may be positioned upstream or downstream of the aftertreatment component 150 of the housing 101.

An inlet assembly 110 is coupled to an inlet end 102 of the housing 101 upstream of the aftertreatment component 150, and configured to receive exhaust gas and communicate the exhaust gas into the housing 101. An outlet conduit 104 is coupled to an opposite end of the housing 101 and configured to expel treated exhaust gas into the environment. In particular embodiments, a perforated plate 140 defining a plurality of perforations 142 may be disposed upstream of the aftertreatment component 150. The perforated plate 140 is configured to facilitate mixing of the reductant with the exhaust gas as it flows towards the aftertreatment component 150. The perforated plate 140 may be disposed within the inlet assembly 110 or within the housing 101 upstream of the aftertreatment component 150.

The inlet assembly 110 is configured to receive exhaust gas in a flow direction that is substantially perpendicular to the longitudinal axis $A_L$ of the housing 101, for example, from a turbine of a turbocharger located upstream of the inlet assembly 110. As defined herein, the term "substantially perpendicular" means that the inlet assembly 110 receives exhaust gas at an angle in a range of 80 degrees to 100 degrees with respect to the longitudinal axis $A_L$. The inlet assembly 110 is configured to redirect the exhaust gas towards the aftertreatment component 150 disposed in the housing, for example, cause the exhaust gas to experience a change in flow direction of approximately 90 degrees (e.g., between 70-110 degrees, inclusive). As shown in FIG. 1, the inlet assembly 110 includes an inlet conduit 112 disposed substantially perpendicular to the longitudinal axis $A_L$ of the housing and configured to receive the exhaust gas, for example, from the engine. The inlet conduit 112 may comprise an inlet flange or tube.

The inlet assembly 110 also includes a flow redirection conduit 113 disposed downstream of the inlet conduit 112 and coupled to the inlet end 102 of the housing 101. The flow redirection conduit 113 is configured to redirect exhaust gas received from the inlet conduit 112 towards the inlet face 152 of the aftertreatment component 150. For example, the flow redirection conduit 113 causes a change in flow direction of the exhaust gas of approximately 90 degrees towards the aftertreatment component 150. The flow redirection conduit 113 has a cross-section corresponding to a cross-section of the housing 101, for example, circular, square, rectangular, elliptical, polygonal, etc.

Having such a side mounted inlet assembly 110 that has the inlet conduit 112 located substantially perpendicular to the longitudinal axis $A_L$ enables compact construction, reduction in space occupied by the aftertreatment system 100, and mounting flexibility. Redirection of the exhaust gas flow towards the aftertreatment component 150 may, however cause the high pressure exhaust gas flow to spread non-uniformly over the inlet face 152 of the aftertreatment component 150, or only enter a portion of the inlet face 152. Thus, the exhaust gas contacts only a portion of a surface area of the aftertreatment component 150 resulting in inefficient utilization of the aftertreatment component 150.

To distribute the exhaust gas uniformly over the inlet face 152 of the aftertreatment component 150, the inlet assembly 110 includes a flow distribution structure 120 disposed within the flow redirection conduit 113. The flow distribution structure 120 is configured to uniformly distribute the exhaust gas over the inlet face 152, while resulting in an exhaust gas pressure drop in a range of less than 2 kPa (e.g., approximately 1.8 kPa), which is lower than conventional systems, and, thereby has lower much impact on fuel efficiency.

Figure 2B:
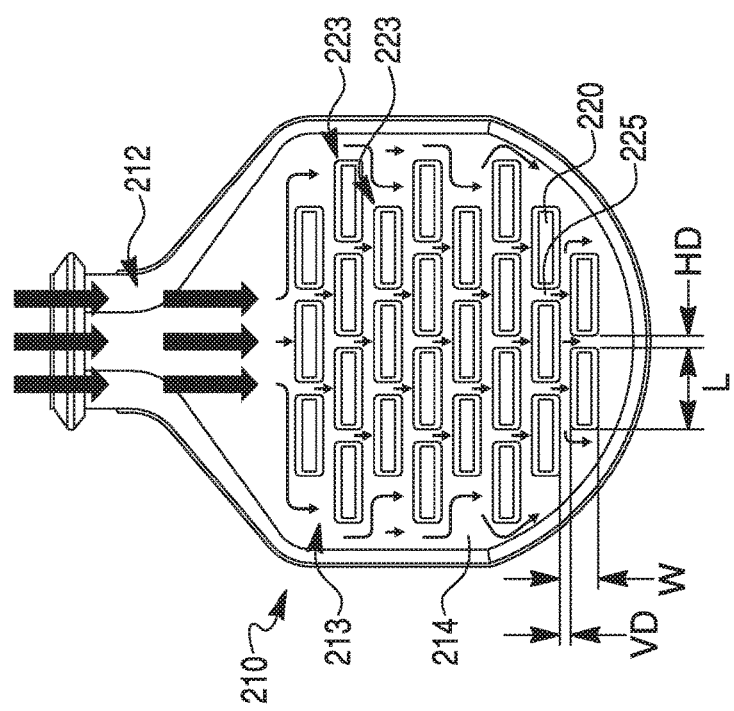
FIG. 2B is front elevation view of the inlet assembly of FIG. 2A.
Figure 2C:
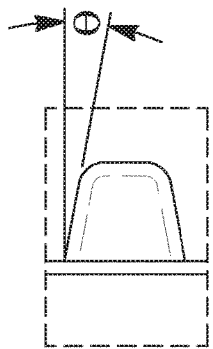
FIG. 2C is an enlarged view of a portion of the inlet assembly of FIG. 2A indicated by the arrow A in FIG. 2A.
Figure 2A:
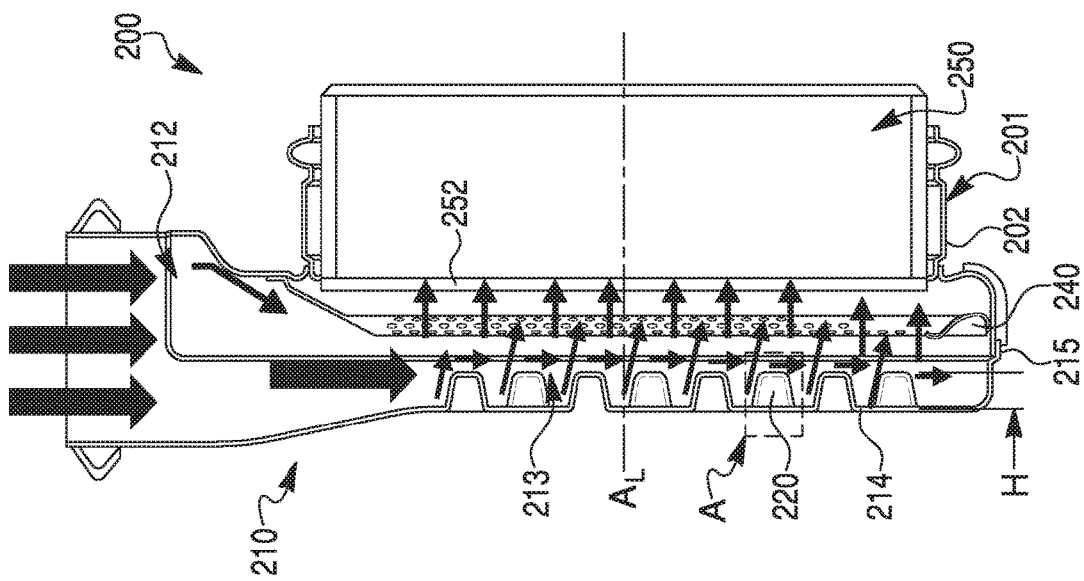
FIG. 2A is a side cross-section view of an embodiment of an inlet assembly coupled to a housing of an aftertreatment system.

In some embodiments, the flow distribution structure 120 comprises a plurality of protrusions projecting from a sidewall 114 of the flow redirection conduit 113 in a direction substantially parallel to the longitudinal axis $A_L$ into the flow redirection conduit 113, the sidewall 114 located opposite to the inlet face 152 of the aftertreatment component 150. As described herein, the term "substantially parallel" means that the plurality of protrusions define an angle between −10 degrees to +10 degrees with respect to the longitudinal axis $A_L$. For example, FIGS. 2A-2C show a portion of an aftertreatment system 200, according to an embodiment. The aftertreatment system 200 includes a housing 201 defining a longitudinal axis $A_L$. An aftertreatment component 250 (e.g., a SCR catalyst, an oxidation catalyst, or any other aftertreatment component as described with respect to the aftertreatment component 150) is disposed within the housing 201 along the longitudinal axis $A_L$.

An inlet assembly 210 is disposed upstream of the housing 201 and coupled thereto. The inlet assembly 210 includes an inlet conduit 212 and a flow redirection conduit 213. The inlet conduit 212 is disposed substantially perpendicular to the longitudinal axis $A_L$ and configured to receive exhaust gas (e.g., from an engine). The inlet conduit 212 may include, for example, an inlet flange or tube.

The flow redirection conduit 213 is disposed downstream of the inlet conduit 212 and coupled to an inlet end 202 of the housing 201. The flow redirection conduit 213 is configured to redirect exhaust gas from the inlet conduit 212 to the inlet face 252 of the aftertreatment component 250. As shown in FIG. 2A, the flow redirection conduit 213 includes an axial sidewall 214 disposed opposite the inlet face 252, and a radial sidewall 215 protruding from a radially outer edge of the axial sidewall 214 towards the housing 201, and coupled to the inlet end 202 of the housing 201 (e.g., welded, or coupled via coupling features such as screws, nuts, bolts, rivets, etc.).

A perforated plate 240 is disposed in the flow redirection conduit 213. A substantial portion of the outer edge of the perforated plate 240 is coupled (e.g., welded) to the radial sidewall 215 of the flow redirection conduit 213. A portion of the perforated plate 240 protruding into the inlet conduit 212 is bent towards a sidewall of the inlet conduit proximate to the housing 201 and coupled thereto (e.g., welded thereto).

The flow redirection conduit 213 includes a plurality of protrusions 220 projecting from the axial sidewall 214 of the flow redirection conduit 213 in a direction substantially parallel to the longitudinal axis $A_L$ into the flow redirection conduit 213, i.e., towards the inlet face 252. The plurality of protrusions 220 are configured to distribute the exhaust gas flow uniformly towards the inlet face 252 of the aftertreatment component 250 as the exhaust gas flows between the plurality of protrusions 220 and is redirected towards the inlet face 252. As used herein, the term "uniformly" means that the exhaust gas is distributed evenly approximately evenly or equally over the inlet face 252 of the aftertreatment component 250, and is represented by a flow distribution index of greater than 90%. In some embodiments, the plurality of protrusions 220 are stamped or molded into the axial sidewall 214 as shown in FIG. 2B. In other embodiments, the plurality of protrusions 220 may be formed separately and welded or bolted onto the axial sidewall 214. The flow redirection conduit 213 has a generally rectangular shape with a first curved sidewall coupled to the inlet conduit 212, and a second curved sidewall opposite the first curved sidewall. The plurality of protrusions 220 deflect or redirect the exhaust gas towards the inlet face 252.

The plurality of protrusions 220 are arranged on the axial sidewall 214 in a set of rows 223, each row 223 being substantially perpendicular to the longitudinal axis $A_L$ as shown in FIG. 2B. As used herein the term "substantially perpendicular" means that each row 223 is oriented at an angle in a range of 80 degrees to 100 degrees with respect to the longitudinal axis $A_L$. Each row 223 of the plurality of protrusions 220 is offset from an adjacent row 223 of the plurality of protrusions 220. This results in a gap 225 formed between each of the plurality of protrusions 220 in one row 223 to be axially offset from a corresponding gap 225 between a set of protrusions 220 of an adjacent row 223. Offsetting the gaps 225 causes the exhaust gas entering the flow redirection conduit 213 from the inlet conduit 212 to flow in a zig-zag pattern through the gaps 225 as shown in FIGS. 2A-2B as the exhaust gas is redirected towards the inlet face 252 of the aftertreatment component 250, therefore causing the exhaust gas to be distributed uniformly or equally over the entire inlet face 252 of the aftertreatment component 250.

In some embodiments, a top row 223 of the plurality of protrusions 220 proximate to the inlet conduit 212 is located slightly above a corresponding top edge of the aftertreatment component 250. For example, a vertical placement of the top row 223 of the protrusions 220 may be at a radial distance from the longitudinal axis which is in a range of 65%-75% of a cross-sectional width (e.g., diameter) of the aftertreatment component 250. In some embodiments, the plurality of protrusions may provide a flow distribution index (FDI) of approximately 95%, and a pressure drop of less than 2 kPa (e.g., approximately 1.8 kPa), thereby having low impact on fuel economy. Furthermore, the plurality of protrusions 220 may also increase structural strength of the inlet assembly 210.

In some embodiments, the plurality of protrusions 220 have a rectangular cross-section. In some embodiments, each protrusion 220 has a height H (i.e., a depth to which the protrusion 220 protrudes into the flow redirection conduit 213 from the sidewall 214 to an opposite end of the protrusion 220) in a range of 10-30 mm (e.g., 10, 12, 14, 16, 18, 20, 22, 24, 26, 28, or 30 mm) inclusive, and a length L (i.e., a horizontal dimension) in a range of 60-80 mm, inclusive (e.g., 60, 62, 64, 66, 68, 70, 72, 74, 76, 78, or 80 mm). In some embodiments, a width W (i.e., a vertical dimension) of each protrusion 220 is in a range of 5-25 mm, inclusive (e.g., 5, 6, 8, 10, 12, 14, 16, 18, 20, 22, 24, or 25 mm). Furthermore, a horizontal distance HD and a vertical distance VD between corresponding edges of adjacent protrusions 220 may be in a range of 5-25 mm, inclusive, i.e., a width of the gap 225 is in a range of 5-25 mm, inclusive (e.g., 5, 6, 8, 10, 12, 14, 16, 18, 20, 22, 24, or 25 mm). In some embodiments, a draft angle θ (FIG. 2C) of each of the protrusions 220 is in a range of 8-12 degrees, inclusive (e.g., 8, 9, 10, 11, or 12 degrees).

Figure 3B:
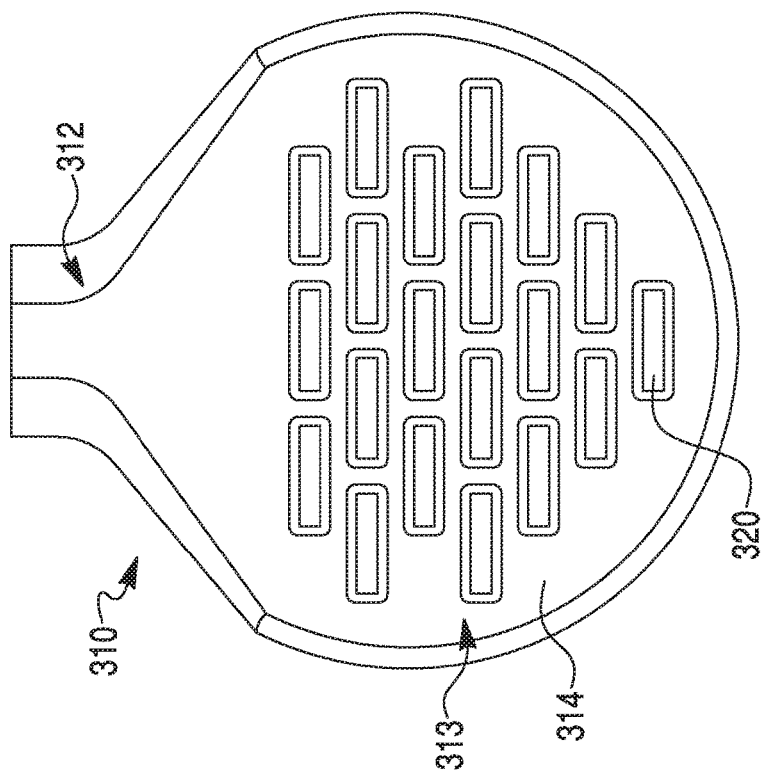
FIG. 3B is a front elevation view of the inlet assembly of FIG. 3A.
Figure 3A:
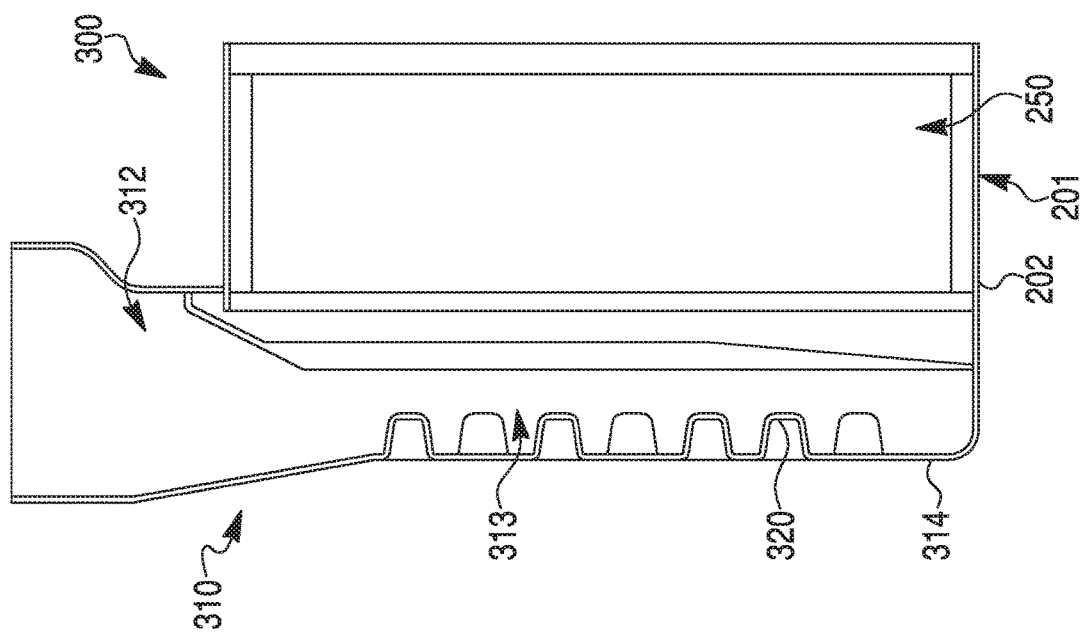
FIG. 3A is a side cross-section view of another embodiment of an inlet assembly coupled to an aftertreatment system.

While the flow redirection conduit 213 of the inlet assembly 210 has a generally rectangular cross-section, in other embodiments, a flow redirection conduit of an inlet assembly may have a circular cross-section or any other suitable cross-section. For example, FIGS. 3A-3B show a portion of an aftertreatment system 300, according to another embodiment. The aftertreatment system 300 includes the housing 201 containing the aftertreatment component 250. An inlet assembly 310 is coupled to the inlet end 202 of the housing 201. The inlet assembly 310 includes an inlet conduit 312, and a flow redirection conduit 313 coupled to the inlet end 202 of the housing 201. The flow redirection conduit 313 includes an axial sidewall having a plurality of protrusions 320 projecting therefrom towards the aftertreatment component 250, as previously described herein. The flow redirection conduit 313 defines a generally circular cross-section. Other inlet assemblies having square, elliptical, polygonal or asymmetrical cross-sections are also envisioned, should be considered to be within the scope of the present disclosure.

Figure 4B:
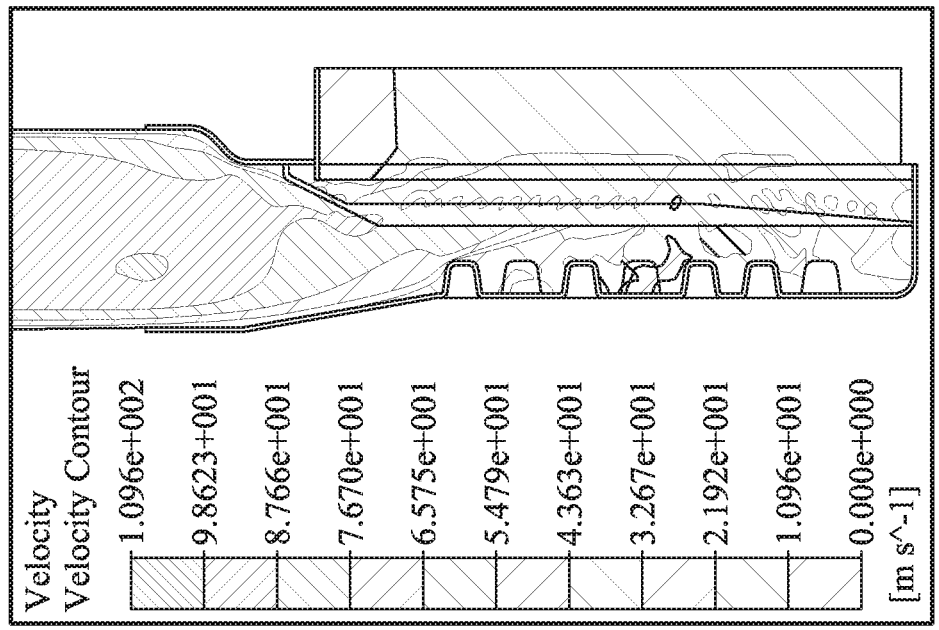
FIGS. 4A-4C are finite element modeling (FEM) simulations showing streamlines, velocity contour and pressure contour, respectively of exhaust gas flowing through the inlet assembly of FIG. 2A-2B into the housing of FIGS. 2A-2B.
Figure 4A:
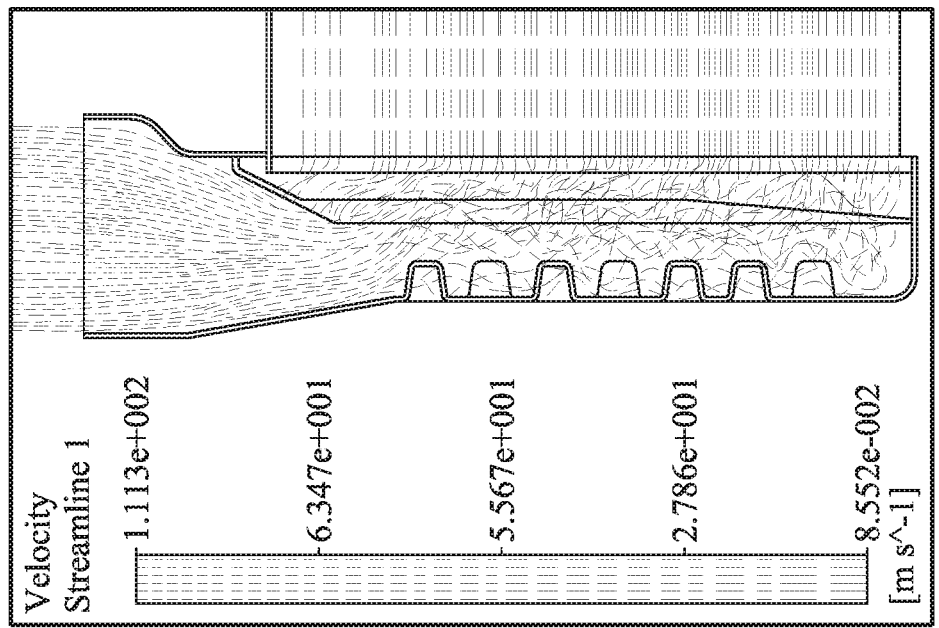
Figure 4C:
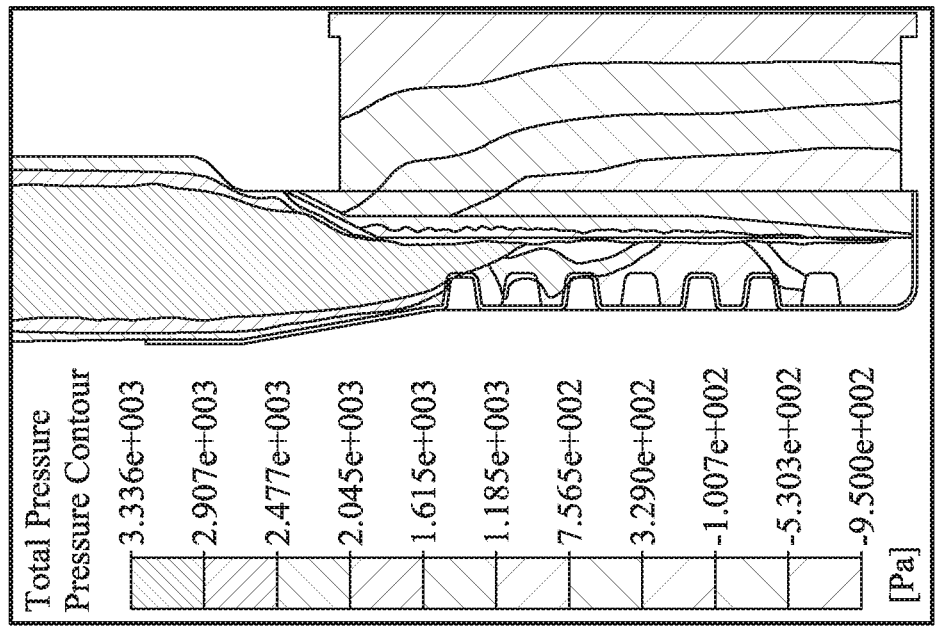

FIGS. 4A-4C are finite element modeling (FEM) simulations showing streamlines, velocity contours and pressure contours, respectively of the exhaust gas flowing through the inlet assembly of FIG. 2A-2B into the housing of FIG. 2A-2B. The vertical distance between the protrusions is 16 mm, the horizontal distance is 24 mm, and the protrusions have a width of 10 mm. A pressure drop of 1.83 kPa is observed in the inlet assembly, and 1.33 kPa is observed across the aftertreatment component. A FDI of approximately 0.95 is observed across the inlet face of the aftertreatment component. Residence time of about 0.023 seconds was observed in the inlet assembly. Similar results were obtained for the inlet assembly of FIGS. 3A-3B.

Referring again to FIG. 1, in some embodiments, the flow distribution structure 120 may include a flow distribution plate having a downstream portion disposed in the flow redirection conduit 113, and an upstream portion opposite the downstream portion and extending into the inlet conduit 112. The flow distribution plate being inclined at an angle with respect to the longitudinal axis $A_L$, and a plurality of slots are defined in the flow distribution plate. The flow distribution plate is configured to distribute the exhaust gas flow uniformly towards the inlet face 152 of the aftertreatment component 150 as the exhaust gas flows through the plurality of slots towards the inlet face 152.

For example, FIGS. 5A-7C show views of various components of an aftertreatment system 400, according to an embodiment. The aftertreatment system 400 includes the housing 201 defining the longitudinal axis $A_L$, and having the aftertreatment component 250 disposed therein.

An inlet assembly 410 is disposed upstream of the housing 201 and coupled thereto. The inlet assembly 410 includes an inlet conduit 412 and a flow redirection conduit 413. The inlet conduit 412 is disposed substantially perpendicular to the longitudinal axis $A_L$ (e.g., at an angle of approximately 90 degrees, or between 70-110 degrees) and configured to receive exhaust gas (e.g., from an engine). The inlet conduit 412 may include, for example, an inlet flange or tube.

The flow redirection conduit 413 is disposed downstream of the inlet conduit 412 and coupled to an inlet end 202 of the housing 201. The flow redirection conduit 413 is configured to redirect exhaust gas from the inlet conduit 412 to the inlet face 252 of the aftertreatment component 250. As shown in FIG. 5A, the flow redirection conduit 413 includes an axial sidewall 414 disposed opposite the inlet face 252, and a radial sidewall 415 protruding from a radially outer edge of the axial sidewall 414 towards the housing 201, and coupled to the inlet end 202 of the housing 201 (e.g., welded, or coupled via coupling features such as screws, nuts, bolts, rivets, etc.).

A flow distribution plate 420 is disposed in the inlet assembly 410. In some embodiments, an upstream portion of the plate 420 is disposed in the inlet conduit 412, and a downstream portion of the plate 420 is disposed in the flow redirection conduit 413. In some embodiments, at least a portion of a radial outer edge 421 of the flow distribution plate 420 is in contact with and coupled to a corresponding inner surface of the flow redirection conduit 413, e.g., the inner surface of the radial sidewall 415. The flow distribution plate 420 may have a shaped corresponding to the shape of the flow redirection conduit 413. In some embodiments, the inlet assembly 410 includes a first segment 411 located axially distal from the housing 201, and a second segment 419 located axially proximate to the housing 201 and coupled thereto.

Figure 7B:
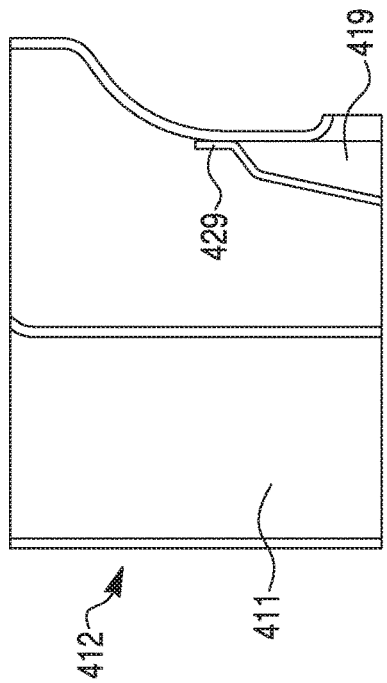
FIG. 7B is a side cross-section view of a portion of the inlet assembly shown by the arrow B in FIG. 5A to show an end of the flow distribution plate.
Figure 7C:
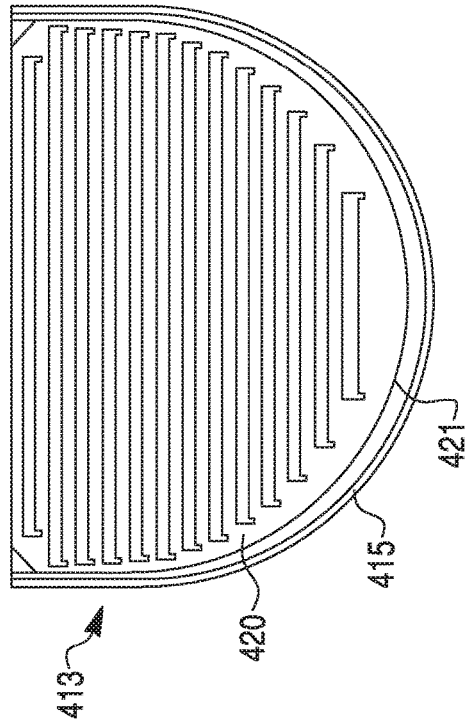
FIG. 7C is rear view of a portion of the inlet assembly to show an opposite end of the flow distribution plate.
Figure 7A:
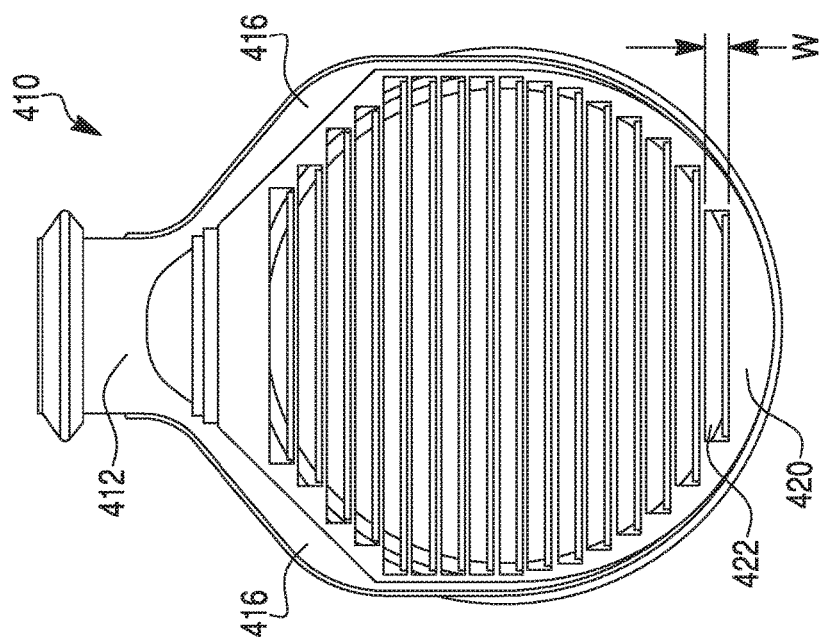
FIG. 7A is rear elevation view of the inlet assembly of FIGS. 5A-5B with the housing removed to show the flow distribution plate disposed therein.

The flow distribution plate 420 may be disposed in the first segment 411, and a radial outer edge 421 of the downstream portion coupled to the radial sidewall 415 of the flow redirection conduit 413 formed by the segment 411, as shown in FIG. 7C. The second segment 419 is then coupled to the first segment 411 (e.g., welded thereto) such that an upstream end 429 of the upstream portion extends into the inlet conduit 412 and is coupled to a sidewall of the inlet conduit 412 formed by the second segment 419 proximate to the housing 201, as shown in FIG. 7B. In some embodiments, the upstream end 429 may be coupled to the sidewall of the inlet conduit 412 via a through weld formed from an outer surface through the sidewall, or a bolt or screw inserted through the sidewall of the inlet conduit 412. Thus, the flow distribution plate 420 is inclined at an angle α with respect to the longitudinal axis $A_L$. In some embodiments, the angle α is in a range of 75-85 degrees, inclusive (e.g., 75, 76, 77, 78, 79, 80, 81, 82, 83, 84, or 85 degrees).

In some embodiments, portions of the radial outer edge 421 of the downstream section of the flow distribution plate 420 located proximate to the inlet conduit 412, are disposed radially inwards of the corresponding portions of the radial sidewall 415 such that openings 416 are formed between the radial sidewall 415 and the corresponding radial outer edge 421 of the downstream section of the flow distribution plate 420. The openings 416 provide a bypass path for a portion of the exhaust gas to bypass the flow distribution plate 420. This may reduce backpressure on the exhaust gas so as to reduce impact on fuel economy.

A plurality of slots 422 are defined in the flow distribution plate 420. The plurality of slots 422 are configured to distribute the exhaust gas flow uniformly towards the inlet face 252 as the exhaust gas flows through the plurality of slots 422. As shown in FIGS. 5A, 6A-6C, 7A and 7C, each slot of the plurality of slots 422 is defined substantially perpendicular to the longitudinal axis $A_L$ of the housing 201. As used herein, the term "substantially perpendicular" means that each slot is oriented at an angle in a range of 80 degrees to 100 degrees with respect to the longitudinal axis $A_L$. The slots 422 may have a width in a range of 8-20 mm, inclusive (e.g., 8, 9, 10, 12, 14, 16, 18, or 20 mm) and a length corresponding to width of the flow distribution plate 420 at the location where a particular slot 422 is located.

In some embodiments, the slots 422 are spaced equidistance from each other. In other embodiments, the distance between adjacent slots 422 may be varied, for example, a larger spacing may be provided between slots proximate to the inlet conduit 412, and a smaller spacing may be provided between slots distal from the inlet conduit 412 (e.g., the spacing may be progressively decreased for each subsequent slot from the inlet conduit 412 to an opposite end of the flow distribution plate 420).

The number and a width of the slots 422 formed through the flow distribution plate 420 define a flow through area for exhaust gas to flow through the flow distribution plate 420. In some embodiments, the plurality of slots 422 provide a flow through area which is greater than 50% of a total area of the flow distribution plate 420, i.e., the flow through area is greater than a total surface area of the plate 420.

The flow distribution plate 420 further comprises a vane 423 projecting from an edge of each of the slots 422 towards the inlet face 252 of the aftertreatment component 250. For example, to form each slot 422, a bracket or C shaped cut may be formed in the flow distribution plate 420. A portion of the flow distribution plate 420 between each edges of the bracket shaped cut is bent towards the aftertreatment component 250 to form the vane 423. In some embodiments, each vane 423 may be oriented approximately perpendicular to the longitudinal axis $A_L$. In some embodiments, each vane 423 has a vane angle β in a range of 75-85 degrees, inclusive corresponding to the inclination angle of the perforated plate 420. The vane angle β may facilitate guidance of the exhaust gas flow towards the inlet face of the aftertreatment component 250.

The plurality of slots 422 and vanes 423 cause the flow distribution plate to guide the exhaust gas flow from upstream end 429 to an opposite end of the of the plate 420 towards the inlet face 252 to uniformly distribute the exhaust gas over the entire inlet face 252 of the aftertreatment component 250. By inclining the plate 420 at the inclination angle α, a volumetric flow rate of the exhaust gas across the flow distribution plate 420 may be kept uniform. Furthermore, recirculation of the exhaust gas at a bottom end of the flow redirection conduit 413 is prevented. The exhaust gas expands as it flows over and through the flow distribution plate thus causing pressure drop in the inlet assembly 410, which is lower than a pressure drop in conventional systems.

In some embodiments, the flow distribution plate 420 may result in a pressure drop of less than 1.7 kPa, which is better than conventional systems, and has lower impact on fuel economy. Furthermore, the flow distribution plate 420 may provide a FDI of approximately 95%.

Figure 5B:
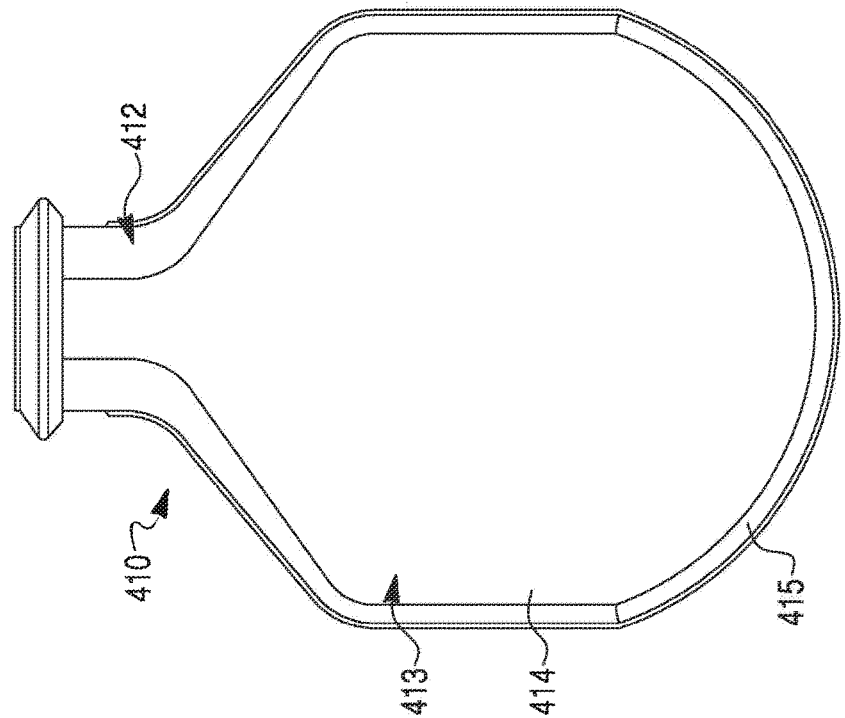
FIG. 5B is front elevation view of the inlet assembly of FIG. 5A.
Figure 5A:
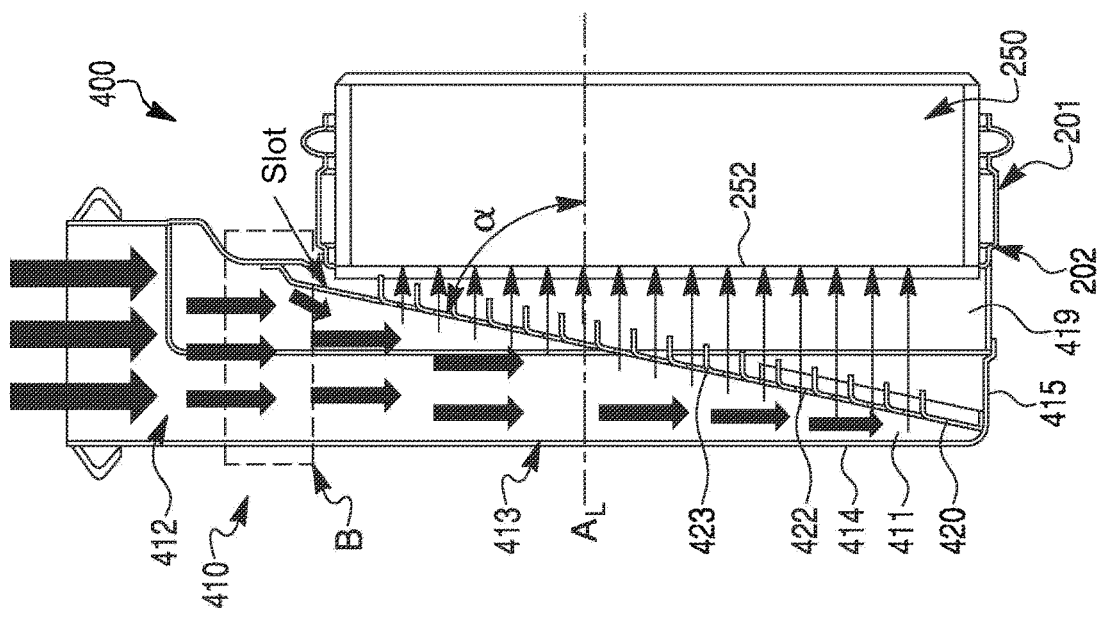
FIG. 5A is a side cross-section view of an inlet assembly including a flow distribution plate coupled to a housing of an aftertreatment system, according to an embodiment.
Figure 6C:
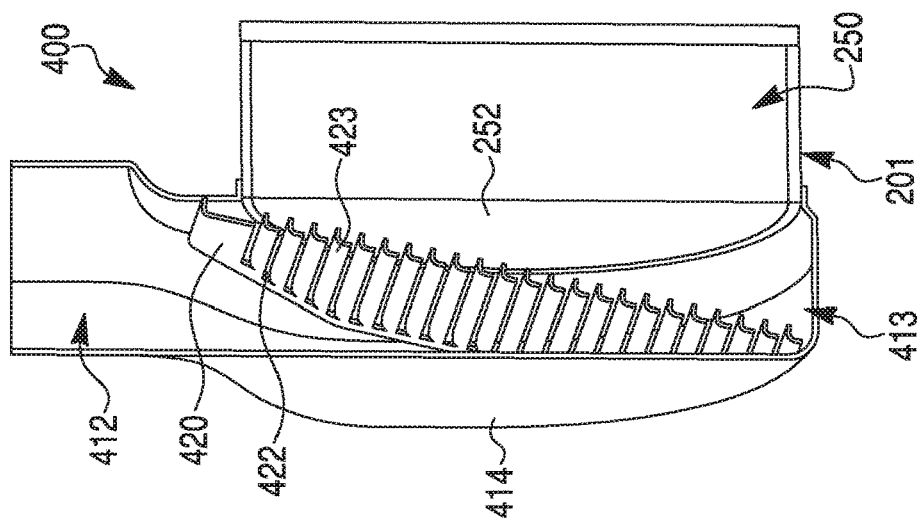
FIG. 6C is another cross-section view of the inlet assembly and the housing of the aftertreatment system shown in FIGS. 5A-5B.
Figure 6B:
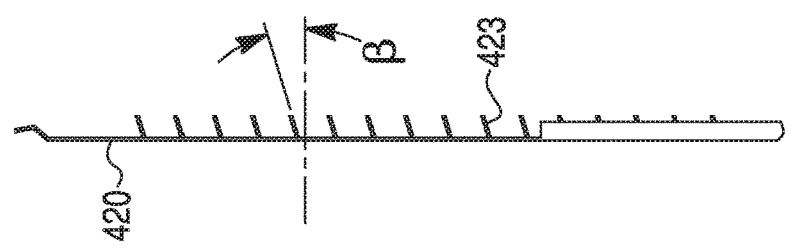
FIG. 6A is a front view and FIG. 6B is a side view of the flow distribution plate included in the inlet assembly of FIGS. 5A-5B.
Figure 6A:
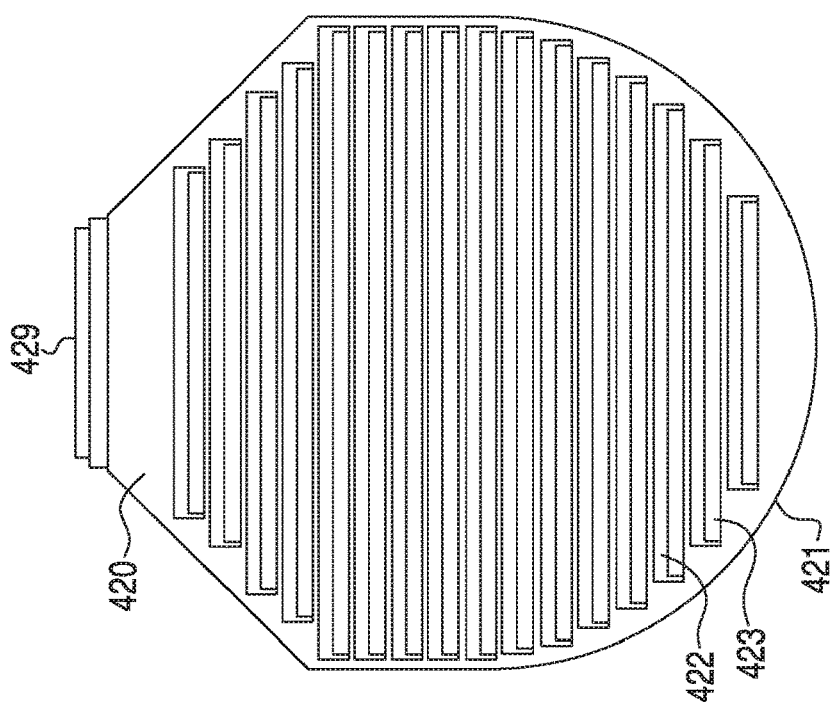
Figure 8B:
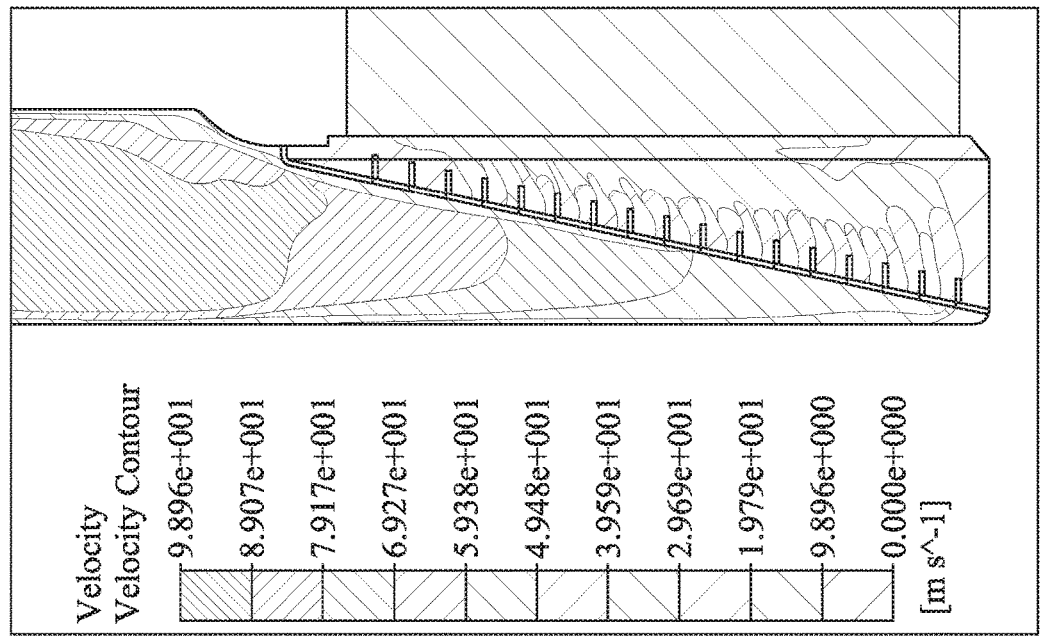
FIGS. 8A-8C are FEM simulations showing streamlines, velocity contour and pressure contour of exhaust gas flowing through the inlet assembly of FIGS. 5A-5B into the housing of FIGS. 5A-5B.
Figure 8A:
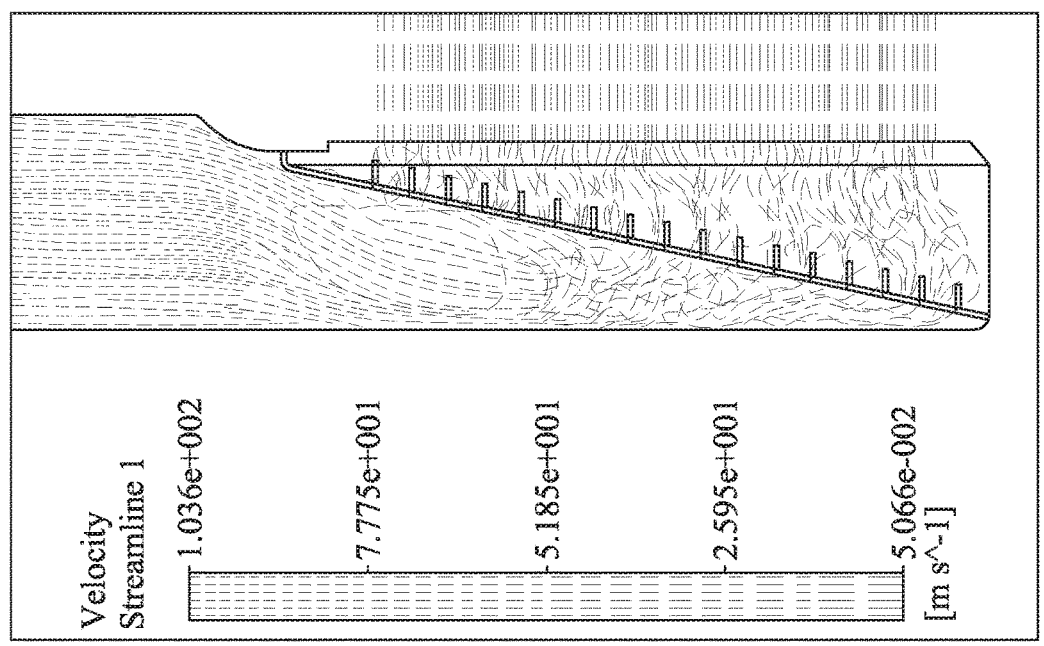
Figure 8C:
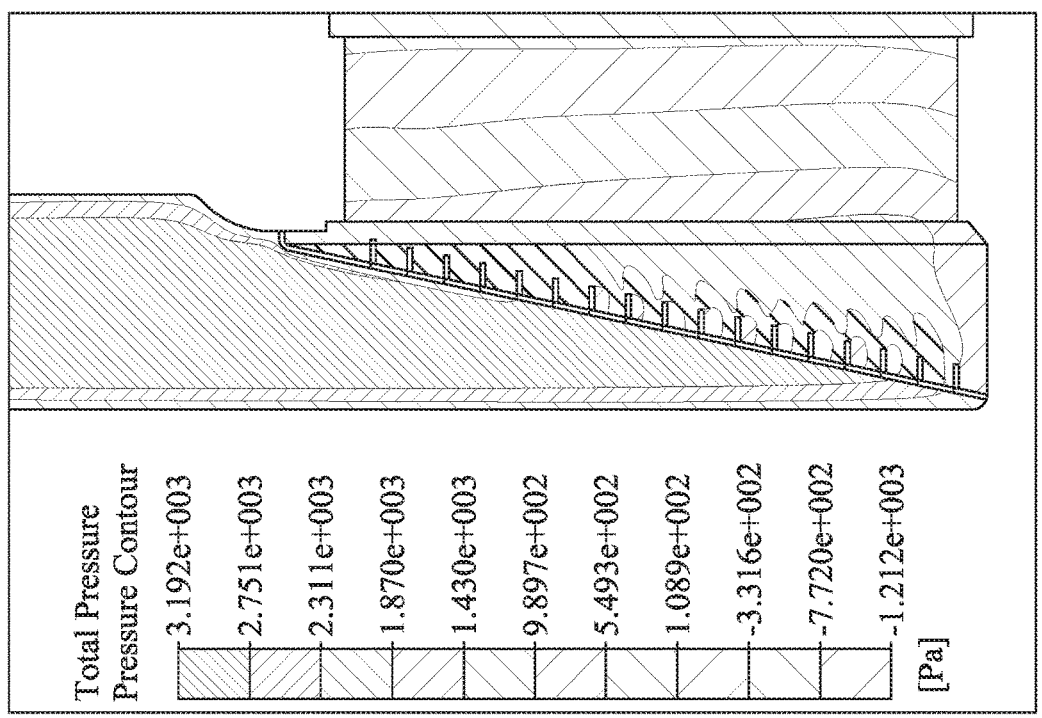

FIGS. 8A-8C are FEM simulations showing streamlines, velocity contours and pressure contours of exhaust gas flowing through the inlet assembly of FIG. 5A-5B into the housing of FIG. 5A-5B. Each slot in the flow distribution plate has a width of 14.35 mm and the plate is inclined at an angle of 75 degrees. A pressure drop of 1.66 kPa is observed in the inlet assembly, and an FDI of approximately 0.96 is observed across the inlet face of the aftertreatment component. Residence time of about 0.027 seconds was observed in the inlet assembly.

Figure 9:
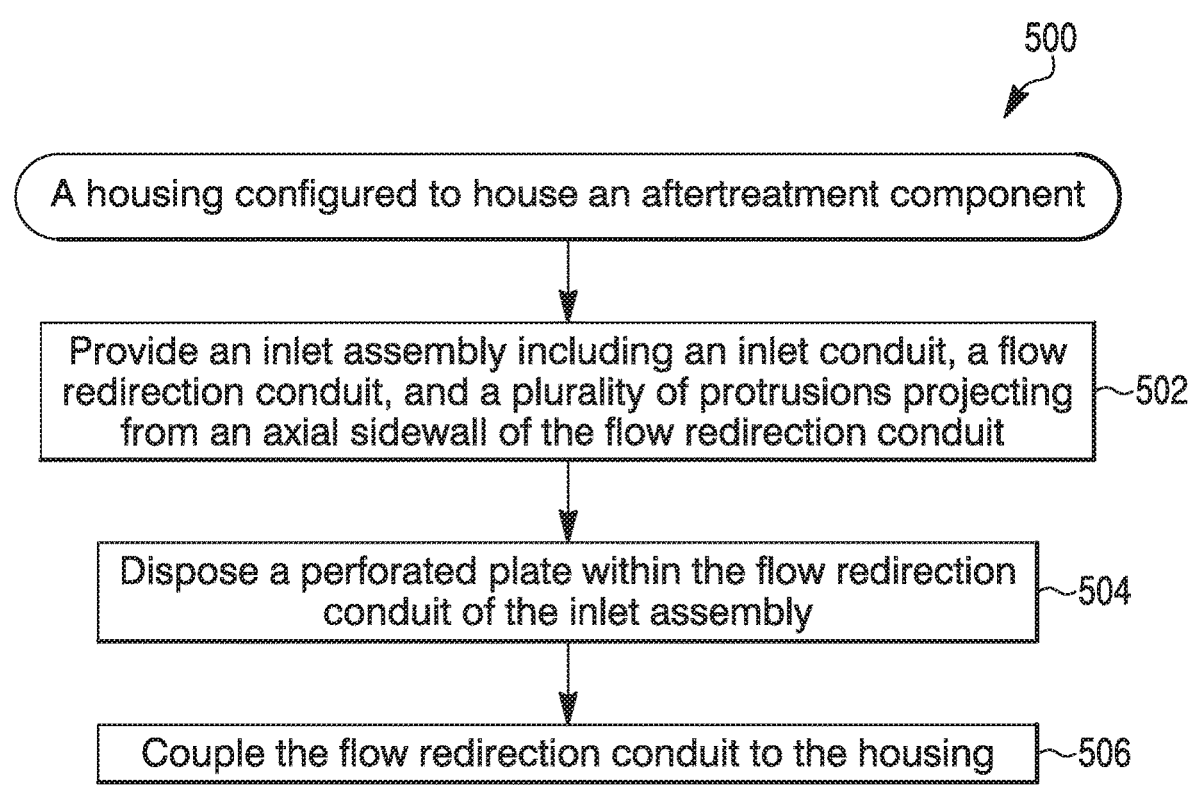
FIG. 9 is a schematic flow diagram of a method for providing uniform exhaust gas flow to an inlet face of an aftertreatment component, according to an embodiment.

FIG. 9 is schematic flow diagram of a method 500 for increasing flow uniformity of exhaust gas over an aftertreatment component (e.g., the aftertreatment component 150, 250) disposed in a housing (e.g., the housing 101, 201) of an aftertreatment system (e.g., the aftertreatment system 100, 200, 300). The method 500 includes providing an inlet assembly, at 502. The inlet assembly (e.g., the inlet assembly 110, 210, 310) includes an inlet conduit (e.g., the inlet conduit 112, 212, 312) configured to be disposed substantially perpendicular to a longitudinal axis of the housing (e.g., the housing 101, 201). The inlet assembly includes a flow redirection conduit (e.g., the flow redirection conduit 113, 213, 313) disposed downstream of the inlet conduit. A plurality of protrusions (e.g., the protrusions 220, 320) project from a sidewall (e.g., the axial sidewall 114, 214, 314) of the flow redirection conduit in a direction substantially parallel to the longitudinal axis into the flow redirection conduit.

In some embodiments, a perforated plate (e.g., the perforated plate 140, 240) is disposed within the flow redirection conduit of the inlet assembly, at 504. At 506, the inlet assembly is coupled to an inlet end of the housing (e.g., welded or bolted thereto). Specifically, the flow redirection conduit (e.g., the flow redirection conduit 113, 213, 313) is coupled to the housing such that the sidewall is located opposite to an inlet face (e.g., the inlet face 152, 252) of the aftertreatment component. The flow redirection conduit receives exhaust gas from the inlet conduit and redirects the exhaust gas towards the inlet face of the aftertreatment component. The plurality of protrusions are configured to distribute the exhaust gas flow uniformly towards the inlet face of the aftertreatment component as the exhaust gas flows between the plurality of protrusions and is redirected towards the inlet face, as previously described herein.

Figure 10:
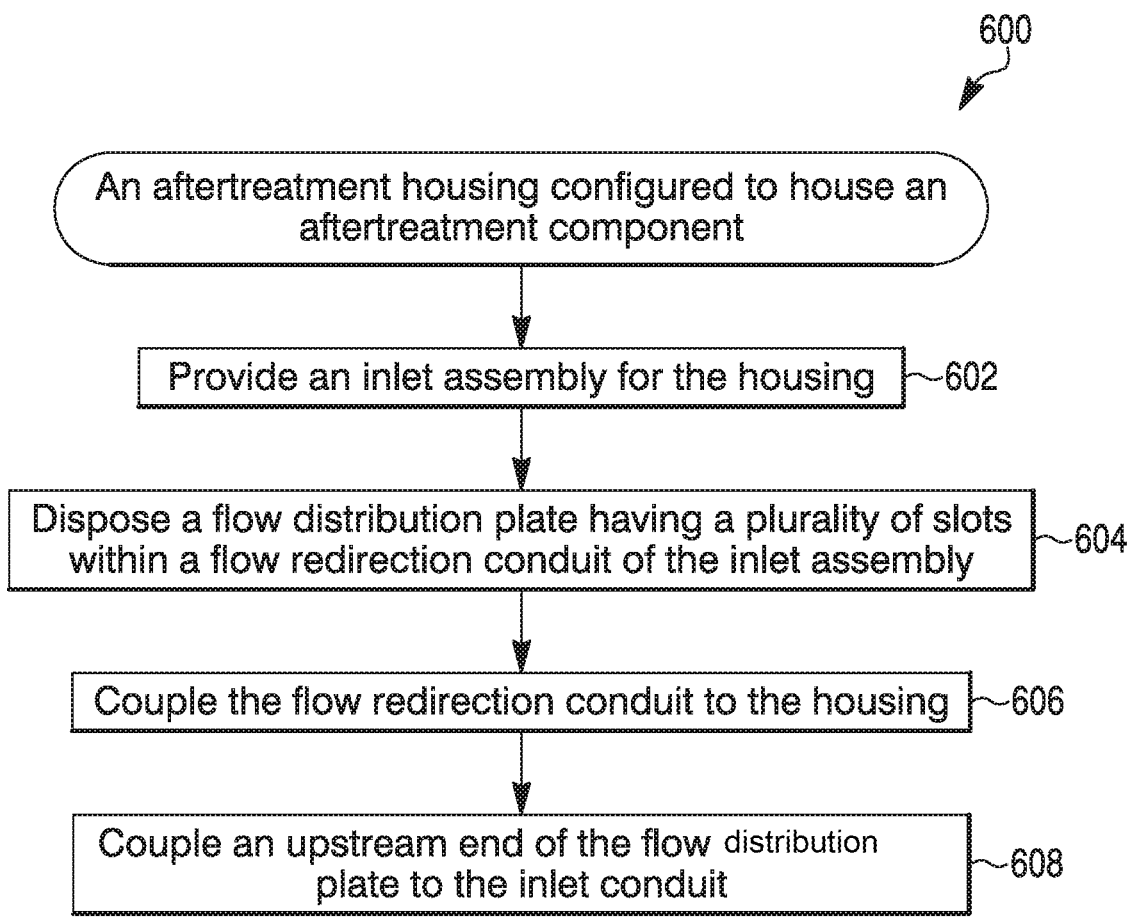
FIG. 10 is a schematic flow diagram of a method for providing uniform exhaust gas flow to an inlet face of an aftertreatment component, according to another embodiment.

FIG. 10 is schematic flow diagram of a method 600 for increasing flow uniformity of exhaust gas over an aftertreatment component (e.g., the aftertreatment component 150, 250) disposed in a housing (e.g., the housing 101, 201) of an aftertreatment system (e.g., the aftertreatment system 400). The method 600 includes providing an inlet assembly for the housing, at 602. The inlet assembly may include, for example, the inlet assembly 410 including the inlet conduit 412 and the flow redirection conduit 413.

At 604, a flow distribution plate is disposed in the flow redirection conduit, for example, coupled to a sidewall of a flow redirection conduit of the inlet assembly. For example, the flow distribution plate 420 is disposed in the inlet assembly 410 such that an upstream portion of the plate 420 is disposed in the inlet conduit 412, and a downstream portion of the plate 420 is disposed in the flow redirection conduit 413. A radial outer edge 421 of the downstream portion of the flow distribution plate 420 is coupled to the radial sidewall 415 of the flow redirection conduit 413 formed by the segment 411, as shown in FIG. 7C. The flow distribution plate includes a plurality of slots (e.g., the slots 422) and may also include vanes (e.g., the vanes 423) extending from edges of the slots towards the inlet face of the aftertreatment component.

At 606, the flow redirection conduit is coupled to the housing. For example, the flow redirection conduit 413 is coupled to the inlet end 202 of the housing 201.

In some embodiments, an upstream end of the flow distribution plate is coupled to the inlet assembly, at 608. For example, an upstream end 429 of the upstream portion of the flow distribution plate 420 extends into the inlet conduit 412 and is coupled to a sidewall of the inlet conduit 412 as shown in FIG. 7B. In some embodiments, portions of the radial outer edge 421 of the downstream section of the flow distribution plate 420 located proximate to the inlet conduit 412, are disposed radially inwards of the corresponding portions of the radial sidewall 415 such that openings 416 are formed between the radial sidewall 415 and the corresponding radial outer edge 421 of the downstream section of the flow distribution plate 420. The openings 416 provide a bypass path for a portion of the exhaust gas to bypass the flow distribution plate 420. This may reduce backpressure on the exhaust gas so as to reduce impact on fuel economy.

It should be noted that the term "example" as used herein to describe various embodiments is intended to indicate that such embodiments are possible examples, representations, and/or illustrations of possible embodiments and such term is not intended to connote that such embodiments are necessarily extraordinary or superlative examples.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As used herein, the term "approximately" generally mean plus or minus 10% of the stated value. For example, about 0.5 would include 0.45 and 0.55, about 10 would include 9 to 11, about 1000 would include 900 to 1100.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An inlet assembly for an aftertreatment system that comprises a housing containing an aftertreatment component, the inlet assembly comprising:
    an inlet conduit configured to be disposed substantially perpendicular to a longitudinal axis of the housing;
    a flow redirection conduit disposed downstream of the inlet conduit and coupled thereto, the flow redirection conduit configured to be coupled to the housing and redirect exhaust gas received from the inlet conduit towards an inlet face of the aftertreatment component,
    wherein the flow redirection conduit comprises a sidewall configured to be located opposite to the inlet face of the aftertreatment component,
    wherein the inlet conduit is configured to provide exhaust gas to the flow redirection conduit at a location between the sidewall and the inlet face of the aftertreatment component,
    wherein the sidewall comprises a plurality of protrusions projecting in a direction substantially parallel to the longitudinal axis of the housing, the plurality of protrusions being configured to distribute exhaust gas flow towards the inlet face of the aftertreatment component as the exhaust gas flows between the plurality of protrusions and is redirected towards the inlet face, and
    wherein the plurality of protrusions are arranged in a set of rows on the sidewall, each row including a set of the plurality of protrusions and being substantially perpendicular to the longitudinal axis.

2. The inlet assembly of claim 1, wherein each row is offset from an adjacent row of the plurality of protrusions.

3. The inlet assembly of claim 1, wherein each protrusion of the plurality of protrusions has a rectangular cross-section.

4. The inlet assembly of claim 3, wherein a horizontal distance and a vertical distance between corresponding edges of adjacent protrusions of the plurality of protrusions is in a range of 5-25 mm.

5. The inlet assembly of claim 3, wherein each protrusion of the plurality of protrusions has a height from the sidewall to an end of the protrusion located opposite the sidewall in a range of 10 mm to 30 mm, and a length in a range of 60 mm to 80 mm.

6. An aftertreatment system for decomposing constituents of an exhaust gas flowing therethrough, comprising:
    a housing;
    an aftertreatment component disposed within the housing along a longitudinal axis of the housing; and
    the inlet assembly as described in claim 1 coupled to an end of the housing.

7. A method, comprising:
    providing a housing for an aftertreatment system;
    disposing an aftertreatment component within the housing along a longitudinal axis of the housing;
    providing an inlet assembly, comprising:
        an inlet conduit, and
        a flow redirection conduit disposed downstream of the inlet conduit and coupled thereto, the flow redirection conduit comprising a sidewall configured to be located opposite to an inlet face of the aftertreatment component, and a plurality of protrusions projecting from the sidewall, the plurality of protrusions being arranged in a set of rows on the sidewall, each row including a set of the plurality of protrusions and being substantially perpendicular to the longitudinal axis, wherein the inlet conduit is configured to provide exhaust gas to the flow redirection conduit at a location between the sidewall and the inlet face of the aftertreatment component; and
    coupling the flow redirection conduit to the housing such that the inlet conduit is oriented substantially perpendicular to the longitudinal axis of the housing, and the plurality of protrusions project in a direction substantially parallel to the longitudinal axis of the housing towards the inlet face of the aftertreatment component,
    wherein the flow redirection conduit is configured to redirect exhaust gas received from the inlet conduit towards the inlet face of the aftertreatment component, and wherein the plurality of protrusions are configured to distribute exhaust gas flow towards the inlet face of the aftertreatment component as the exhaust gas flows between the plurality of protrusions and is redirected towards the inlet face.

8. The method of claim 7, wherein each row is offset from an adjacent row of the plurality of protrusions.

9. The method of claim 7, wherein each protrusion of the plurality of protrusions has a rectangular cross-section.

10. An inlet assembly for an aftertreatment system that comprises a housing containing an aftertreatment component, the inlet assembly comprising:
    an inlet conduit configured to be disposed substantially perpendicular to a longitudinal axis of the housing;
    a flow redirection conduit disposed downstream of the inlet conduit and coupled thereto, the flow redirection conduit configured to be coupled to the housing and redirect exhaust gas received from the inlet conduit towards an inlet face of the aftertreatment component; and
    a flow distribution plate disposed in the flow redirection conduit, wherein the flow distribution plate is inclined at an angle with respect to the longitudinal axis, and wherein the flow distribution plate comprises a plurality of slots configured to distribute exhaust gas flow towards the inlet face of the aftertreatment component as the exhaust gas flows through the plurality of slots towards the inlet face, and wherein the flow distribution plate comprises a plurality of vanes, each projecting from an edge of one of the slots towards the inlet face of the aftertreatment component in a direction parallel to the longitudinal axis of the housing.

11. The inlet assembly of claim 10, wherein at least a portion of a radial outer edge of the flow distribution plate is in contact with and coupled to a corresponding inner surface of the flow redirection conduit.

12. The inlet assembly of claim 10, wherein each slot of the plurality of slots is oriented substantially perpendicular to the longitudinal axis.

13. The inlet assembly of claim 10, wherein the angle at which the flow distribution plate is inclined is in a range of 75 to 85 degrees.

14. The inlet assembly of claim 10, wherein the plurality of slots define a flow through area for exhaust gas to flow through the flow distribution plate, the flow through area being greater than 50% of a total area of the flow distribution plate.

15. The inlet assembly of claim 10, wherein the flow distribution plate comprises a downstream portion disposed in the flow redirection conduit, and an upstream portion opposite the downstream portion, the upstream portion extending into the inlet conduit.

16. An aftertreatment system for decomposing constituents of an exhaust gas flowing therethrough, comprising:
a housing;
an aftertreatment component disposed within the housing along a longitudinal axis of the housing; and
the inlet assembly as described in claim 10 coupled to an end of the housing.

17. A method, comprising:
providing a housing for an aftertreatment system;
disposing an aftertreatment component within the housing along a longitudinal axis of the housing;
providing an inlet assembly, comprising:
an inlet conduit, and
a flow redirection conduit disposed downstream of the inlet conduit and coupled thereto;
disposing a flow distribution plate within the flow redirection conduit, the flow distribution plate defining a plurality of slots; and
coupling the flow redirection conduit to the housing,
wherein the flow redirection conduit is configured to redirect exhaust gas received from the inlet conduit towards an inlet face of the aftertreatment component, and
wherein the flow distribution plate is inclined at an angle with respect to a longitudinal axis of the housing, and wherein the plurality of slots are configured to distribute exhaust gas flow towards the inlet face of the aftertreatment component as the exhaust gas flows through the plurality of slots towards the inlet face, and wherein the flow distribution plate comprises a plurality of vanes, each projecting from an edge of one of the slots towards the inlet face of the aftertreatment component in a direction parallel to the longitudinal axis of the housing.

18. The method of claim 17, wherein each slot of the plurality of slots is oriented substantially perpendicular to the longitudinal axis.

19. The method of claim 17, wherein the angle at which the flow distribution plate is inclined is in a range of 75 to 85 degrees.

20. The method of claim 17, wherein the plurality of slots define a flow through area for exhaust gas to flow through the flow distribution plate, the flow through area being greater than 50% of a total area of the flow distribution plate.

21. An inlet assembly for an aftertreatment system that comprises a housing containing an aftertreatment component, the inlet assembly comprising:
an inlet conduit configured to be disposed substantially perpendicular to a longitudinal axis of the housing;
a flow redirection conduit disposed downstream of the inlet conduit and coupled thereto, the flow redirection conduit configured to be coupled to the housing and redirect exhaust gas received from the inlet conduit towards an inlet face of the aftertreatment component,
wherein the flow redirection conduit comprises a sidewall configured to be located opposite to the inlet face of the aftertreatment component, and
wherein the sidewall comprises a plurality of protrusions projecting in a direction substantially parallel to the longitudinal axis of the housing, the plurality of protrusions being configured to distribute exhaust gas flow towards the inlet face of the aftertreatment component as the exhaust gas flows between the plurality of protrusions and is redirected towards the inlet face,
wherein the plurality of protrusions are arranged in a set of rows on the sidewall, each row including a set of the plurality of protrusions and being substantially perpendicular to the longitudinal axis, and
wherein each protrusion of the plurality of protrusions has a rectangular cross-section.

22. An inlet assembly for an aftertreatment system that comprises a housing containing an aftertreatment component, the inlet assembly comprising:
an inlet conduit configured to be disposed substantially perpendicular to a longitudinal axis of the housing;
a flow redirection conduit disposed downstream of the inlet conduit and coupled thereto, the flow redirection conduit configured to be coupled to the housing and redirect exhaust gas received from the inlet conduit towards an inlet face of the aftertreatment component,
wherein the flow redirection conduit comprises a sidewall configured to be located opposite to the inlet face of the aftertreatment component, and
wherein the sidewall comprises a plurality of protrusions projecting in a direction substantially parallel to the longitudinal axis of the housing, the plurality of protrusions being configured to distribute exhaust gas flow towards the inlet face of the aftertreatment component as the exhaust gas flows between the plurality of protrusions and is redirected towards the inlet face,
wherein the plurality of protrusions are arranged in a set of rows on the sidewall, each row including a set of the plurality of protrusions and being substantially perpendicular to the longitudinal axis, and
wherein a horizontal distance and a vertical distance between corresponding edges of adjacent protrusions of the plurality of protrusions is in a range of 5-25 mm.

23. An inlet assembly for an aftertreatment system that comprises a housing containing an aftertreatment component, the inlet assembly comprising:
an inlet conduit configured to be disposed substantially perpendicular to a longitudinal axis of the housing;
a flow redirection conduit disposed downstream of the inlet conduit and coupled thereto, the flow redirection conduit configured to be coupled to the housing and redirect exhaust gas received from the inlet conduit towards an inlet face of the aftertreatment component,
wherein the flow redirection conduit comprises a sidewall configured to be located opposite to the inlet face of the aftertreatment component, and
wherein the sidewall comprises a plurality of protrusions projecting in a direction substantially parallel to the longitudinal axis of the housing, the plurality of protrusions being configured to distribute exhaust gas flow towards the inlet face of the aftertreatment component as the exhaust gas flows between the plurality of protrusions and is redirected towards the inlet face,
wherein the plurality of protrusions are arranged in a set of rows on the sidewall, each row including a set of the plurality of protrusions and being substantially perpendicular to the longitudinal axis, and wherein each protrusion of the plurality of protrusions has a height from the sidewall to an end of the protrusion located opposite the sidewall in a range of 10 mm to 30 mm, and a length in a range of 60 mm to 80 mm.

24. A method, comprising:
providing a housing for an aftertreatment system;
disposing an aftertreatment component within the housing along a longitudinal axis of the housing;
providing an inlet assembly, comprising:
an inlet conduit, and
a flow redirection conduit disposed downstream of the inlet conduit and coupled thereto, the flow redirection conduit comprising a sidewall configured to be located opposite to an inlet face of the aftertreatment component, and a plurality of protrusions projecting from the sidewall, the plurality of protrusions being arranged in a set of rows on the sidewall, each row including a set of the plurality of protrusions and being substantially perpendicular to the longitudinal axis; and
coupling the flow redirection conduit to the housing such that the inlet conduit is oriented substantially perpendicular to the longitudinal axis of the housing, and the plurality of protrusions project in a direction substantially parallel to the longitudinal axis of the housing towards the inlet face of the aftertreatment component,
wherein the flow redirection conduit is configured to redirect exhaust gas received from the inlet conduit towards the inlet face of the aftertreatment component, wherein the plurality of protrusions are configured to distribute exhaust gas flow towards the inlet face of the aftertreatment component as the exhaust gas flows between the plurality of protrusions and is redirected towards the inlet face, and wherein each protrusion of the plurality of protrusions has a rectangular cross-section.

25. An inlet assembly for an aftertreatment system that comprises a housing containing an aftertreatment component, the inlet assembly comprising:
an inlet conduit configured to be disposed substantially perpendicular to a longitudinal axis of the housing;
a flow redirection conduit disposed downstream of the inlet conduit and coupled thereto, the flow redirection conduit configured to be coupled to the housing and redirect exhaust gas received from the inlet conduit towards an inlet face of the aftertreatment component; and
a flow distribution plate disposed in the flow redirection conduit, wherein the flow distribution plate is inclined at an angle with respect to the longitudinal axis, wherein:
the flow distribution plate comprises a plurality of slots configured to distribute exhaust gas flow towards the inlet face of the aftertreatment component as the exhaust gas flows through the plurality of slots towards the inlet face, and
the flow distribution plate comprises a downstream portion disposed in the flow redirection conduit, and an upstream portion opposite the downstream portion, the upstream portion extending into the inlet conduit.

* * * * *